(12) United States Patent
Luescher

(10) Patent No.: US 9,259,817 B2
(45) Date of Patent: Feb. 16, 2016

(54) TOOL CLAMPING FIXTURE

(75) Inventor: Bruno Luescher, Zofingen (CH)

(73) Assignee: Robert Bosch GmbH, Stuttgart (DE)

( * ) Notice: Subject to any disclaimer, the term of this patent is extended or adjusted under 35 U.S.C. 154(b) by 381 days.

(21) Appl. No.: 13/979,270

(22) PCT Filed: Dec. 27, 2011

(86) PCT No.: PCT/EP2011/074108
§ 371 (c)(1),
(2), (4) Date: Sep. 27, 2013

(87) PCT Pub. No.: WO2012/100895
PCT Pub. Date: Aug. 2, 2012

(65) Prior Publication Data
US 2014/0015206 A1    Jan. 16, 2014

(30) Foreign Application Priority Data

Jan. 25, 2011   (DE) .......................... 10 2011 003 098

(51) Int. Cl.
| | |
|---|---|
| *B23Q 3/12* | (2006.01) |
| *B24B 23/02* | (2006.01) |
| *B27B 5/32* | (2006.01) |
| *B24B 45/00* | (2006.01) |

(52) U.S. Cl.
CPC ................ *B23Q 3/12* (2013.01); *B24B 23/022* (2013.01); *B24B 45/006* (2013.01); *B27B 5/32* (2013.01); *Y10T 279/33* (2015.01)

(58) Field of Classification Search
CPC   Y10T 279/333; B24B 23/022; B24B 45/006; B23Q 3/12; B27B 5/32
See application file for complete search history.

(56) References Cited

U.S. PATENT DOCUMENTS

| | | | | | |
|---|---|---|---|---|---|
| 4,409,721 | A  | * | 10/1983 | Tomita ............... | B23Q 3/15553 279/900 |
| 5,253,880 | A  | * | 10/1993 | Won ....................... | B23B 31/18 279/106 |
| 6,497,419 | B2 | * | 12/2002 | Varnau .................. | B23B 31/185 279/137 |
| 6,569,001 | B2 | * | 5/2003 | Rudolf ................... | B24B 45/006 451/344 |
| 6,910,694 | B2 | * | 6/2005 | Hartmann ............. | B24B 23/022 279/141 |
| 6,953,197 | B2 | * | 10/2005 | Hartmann ................ | B27B 5/32 279/141 |
| 7,013,987 | B2 | * | 3/2006 | Nock ..................... | B23D 47/12 173/132 |
| 8,925,931 | B2 | * | 1/2015 | Sergyeyenko .......... | B24B 23/04 279/141 |
| 8,960,688 | B2 | * | 2/2015 | Zhou .................... | B23D 61/006 279/141 |
| 9,050,663 | B2 | * | 6/2015 | Zhou .................... | B23B 31/4073 |

FOREIGN PATENT DOCUMENTS

EP       2 213 419  A1    8/2010

OTHER PUBLICATIONS

International Search Report corresponding to PCT Application No. PCT/EP2011/074108, mailed Apr. 23, 2012 (German and English language document) (5 pages).

* cited by examiner

*Primary Examiner* — Eric A Gates
(74) *Attorney, Agent, or Firm* — Maginot, Moore & Beck LLP

(57) ABSTRACT

A tool clamping fixture includes at least one clamping unit, at least one operating unit, and at least one return damping unit. The at least one clamping unit is configured to fixedly clamp a machining tool in an axial direction. The at least one operating unit is configured to actuate the at least one clamping unit. The at least one return damping unit is at least configured to damp a return motion of the at least one operating unit. The at least one return damping unit is also configured to generate friction torques of different magnitudes in opposite directions of motion of the at least one operating unit.

9 Claims, 3 Drawing Sheets

TOOL CLAMPING FIXTURE

This application is a 35 U.S.C. §371 National Stage Application of PCT/EP2011/074108, filed on Dec. 27, 2011, which claims the benefit of priority to Serial No. DE 10 2011 003 098.0, filed on Jan. 25, 2011 in Germany, the disclosures of which are incorporated herein by reference in their entirety.

BACKGROUND

Tool clamping fixtures, in particular oscillation tool clamping fixtures, which have a clamping unit for clamping a machining tool in an axial direction, a control unit for actuating the clamping unit, and a return damping unit, which is provided to damp a return motion of the control unit, are already known.

SUMMARY

The disclosure is based on a tool clamping fixture, in particular an oscillation tool clamping fixture, having at least one clamping unit for clamping a machining tool in an axial direction, having at least one control unit for actuating the clamping unit, and having at least one return damping unit, which is provided to at least damp a return motion of the control unit.

It is proposed that the return damping unit is provided to generate friction torques of different magnitude in oppositely directed motional directions of the control unit. In this context, the term "provided" is intended to define specially equipped and/or specially configured. By a "clamping unit" should here be understood, in particular, a unit which secures a machining tool by means of a form closure and/or by means of a force closure along the axial direction, in particular to a tool holder of a portable machine tool. Preferably, in a clamping mode of the clamping unit, a clamping force acts along the axial direction on the machining tool. The term "axial direction" is here intended to define, in particular, a direction which runs preferably at least substantially parallel to a pivot axis and/or rotation axis of a drive shaft and/or spindle of a portable machine tool, which drive shaft and/or spindle is/are provided to drive the machining tool. By "substantially parallel" should here be understood, in particular, an alignment of a direction relative to a reference direction, in particular in one plane, wherein the direction has in relation to the reference direction a deviation of, in particular, less than 8°, advantageously less than 5°, and particularly advantageously less than 2°. The term "control unit" is here intended to define, in particular, a unit which has at least one control element, that can be actuated directly by an operator, and which is provided to influence and/or alter, by an actuating action and/or by the inputting of parameters, a process and/or a state of a unit coupled to the control unit.

By a "return damping unit" should here be understood, in particular, a unit which is specifically provided to convert one energy form, in particular a kinetic energy of a control lever of the control unit, in at least one operating state into another energy form, in particular a thermal energy, and in particular is provided to generate a friction torque which is greater than a friction torque which is generated upon a motion decoupled from the return damping unit. In particular, the friction torque generated by means of the return damping unit is at least more than twice as large as a friction torque generated in the motion decoupled from the return damping unit, preferably at least more than four times greater, and particularly preferably more than six times greater. Preferably, a magnitude of the friction torque generated by means of the return damping unit is direction-dependent. Preferably, the return damping unit generates in at least one operating state a friction torque which, in addition to a bearing-conditioned friction torque, acts on the control lever. Preferably, the return damping unit is provided to generate in a clamping direction, upon a motion of the control unit, in particular upon a rotary motion about at least one axis, a friction torque which, upon a motion of the control unit, in particular upon a rotary motion about at least one axis, is generated in a release direction. In particular, the friction torque which is generated in the clamping direction upon a motion of the control unit, in particular upon a rotary motion about at least one axis, is at least more than twice as large as a friction torque generated in the release direction upon the motion of the control unit, in particular upon a rotary motion about at least one axis, preferably at least more than four times greater and particularly preferably more than six times greater. By a "clamping direction" should here be understood, in particular, a direction in which the control unit is movable for actuation of the clamping unit, wherein, as a consequence of the movement of the control unit, a clamping force for clamping of the machining tool is generated by means of the clamping unit. By a "release direction" should here be understood, in particular, a direction in which the control unit can be moved for actuation of the clamping unit, wherein, as a consequence of the movement of the control unit, a clamping force generated by the clamping unit is released. By means of the disclosed configuration of the tool clamping fixture, a situation in which the control unit snaps back into a starting position after a clamping operation can advantageously be avoided. Good ease of operation can thus advantageously be achieved.

Advantageously, the return damping unit has at least one return damping element, which is disposed on a transmission element of the control unit. Preferably, the return damping element is configured as a spring element. In an alternative configuration, the return damping element is configured as a wedge element. In a further alternative configuration of the disclosed tool clamping fixture, the return damping element is preferably configured as a bearing element. It is also conceivable, however, for the return damping element to have a different configuration which appears sensible to a person skilled in the art. The term "transmission element" is here intended to define, in particular, an element which is provided to transmit forces and/or torques from a control lever of the control unit to the return damping element and/or to transmit forces and/or torques from a control lever of the control unit to the clamping unit for actuation of this same. Preferably, the transmission unit is connected in a rotationally fixed manner to the control lever of the control unit. By "connected in a rotationally fixed manner" should here be understood, in particular, a connection which invariably transmits a torque and/or a rotary motion. A compact return damping unit can advantageously be achieved.

It is further proposed that the return damping element is disposed along a peripheral direction on the transmission element of the control unit. Preferably, the return damping element has an extent which runs along the peripheral direction. The transmission element is thus preferably enclosed along the peripheral direction by the return damping element. Particularly preferably, the return damping element entwines the transmission element along an angular range greater than 60°, preferably greater than 180°, and particularly preferably greater than 350° along the peripheral direction. By a "peripheral direction" should here be understood a direction which runs at least substantially in a plane extending at least substantially perpendicular to the axial direction. It is also conceivable, however, for the return damping element to be disposed at a different location which appears sensible to a person skilled in the art. Preferably, the transmission element has a fine surface structure. By a "fine surface structure" should here be understood, in particular, a surface structure which has an average roughness $R_a$ less than 1 µm. A high efficiency of the return damping element for damping the return motion of the control unit can advantageously be achieved.

Preferably, the return damping element is configured as a leg spring. By a "leg spring" should here be understood, in particular, an elastic component which preferably has at least one leg, extending tangentially to at least one coil and configured, in particular, as a bending beam, and which preferably in at least one operating state is subjected to torsional stress about at least one axis, in particular an axis running at least substantially parallel to the axial direction. The leg spring preferably has a plurality of coils, which entwine the transmission element along the peripheral direction. Particularly preferably, the leg spring has at least two legs, which are preferably supported in receiving elements of a housing of a portable machine tool. In particular, at least one leg of the leg spring, at least in an operating state, transmits forces and/or torques to the housing. Preferably, at least one leg of the leg spring is provided for pretensioning of the leg spring. A return damping element can be achieved in a constructively simple manner, in particular a return damping element which can advantageously generate friction torques of different magnitude in oppositely directed motional directions of the control unit.

It is additionally proposed that the return damping element is pivotably mounted. Preferably, the return damping element is mounted pivotably relative to the transmission element. A pivot axis of the return damping element here runs preferably, in a mounted state, at least substantially parallel to the axial direction. It is also conceivable, however, for the pivot axis of the return damping element to run along a different direction which appears sensible to a person skilled in the art. Preferably, the return damping element is pivoted about the pivot axis as a consequence of a motion of the transmission element. The return damping element preferably acts directly and/or indirectly on the transmission element in order to damp, in particular as a consequence of a friction torque, a return motion of the control unit. A direction-dependent action of the return damping element can be achieved in a constructively simple manner.

Advantageously, the return damping unit has at least one spring element, which is provided to subject the return damping element to a spring force in at least one direction. Preferably, the spring element is configured as a tension spring. It is also conceivable, however, for the spring element to have a different configuration which appears sensible to a person skilled in the art, such as, for example, as a compression spring, as a cup spring, as a volute spring, etc. The return damping element is preferably subjected to a spring force of the spring element along a direction running at least substantially perpendicular to the axial direction. Particularly preferably, the return damping element is subjected to a spring force of the spring element along the clamping direction. Advantageously, a spring force which is provided to move the return damping element into a return damping position can be generated.

It is further proposed that the return damping unit has at least one stop element, which is provided to limit a motion of the return damping element in at least one direction. By a "stop element" should here be understood, in particular, an element which is provided to limit a motional path of a further element along at least one motional direction. Preferably, the stop element is provided to limit a motional path of the return damping element as a consequence of a motion of the return damping element induced by a spring force of the spring element and/or as a consequence of a motion of the return damping element induced by a motion of the control unit in the clamping direction. It can thus advantageously be ensured that the return damping element, upon a return motion of the control unit, is secured in a position necessary for damping the return motion of the control unit.

Preferably, the return damping element is configured as a freewheeling roller bearing, which is provided to prevent a rotary motion at least in one rotational direction. By a "freewheeling roller bearing" should here be understood, in particular, a roller bearing which has at least one clamping body provided to prevent and/or block a rotary motion of the roller bearing in at least one rotational direction. Particularly preferably, the freewheeling slide bearing is provided to prevent and/or block a rotary motion in the clamping direction. Preferably, the transmission element bears in a mounted state, along the axial direction, against an inner race of the roller bearing. A large friction torque for damping a return motion of the control unit can advantageously be achieved.

The disclosure is further based on a portable machine tool, in particular a portable machine tool having an oscillatingly drivable spindle, having at least one disclosed tool clamping fixture. By a "portable machine tool" should here be understood, in particular, a machine tool, in particular a hand-operated machine tool, which can be transported without a transport machine by an operator. The portable machine tool has, in particular, a weight which is less than 40 kg, preferably less than 10 kg, and particularly preferably less than 5 kg. Good ease of operation for an operator of the machine tool can advantageously be achieved.

The disclosed tool clamping fixture is here not intended to be limited to the above-described application and embodiment. In particular, the disclosed tool clamping fixture, in order to effect a working method described herein, can have a number of individual elements, components and units which differs from a number stated herein.

BRIEF DESCRIPTION OF THE DRAWINGS

Further advantages emerge from the following drawing description. In the drawing, illustrative embodiments of the disclosure are represented. The drawing and the description contain numerous features in combination. The person skilled in the art will expediently also view the features individually and combine them into sensible further combinations, wherein.

DETAILED DESCRIPTION

Figure 1:
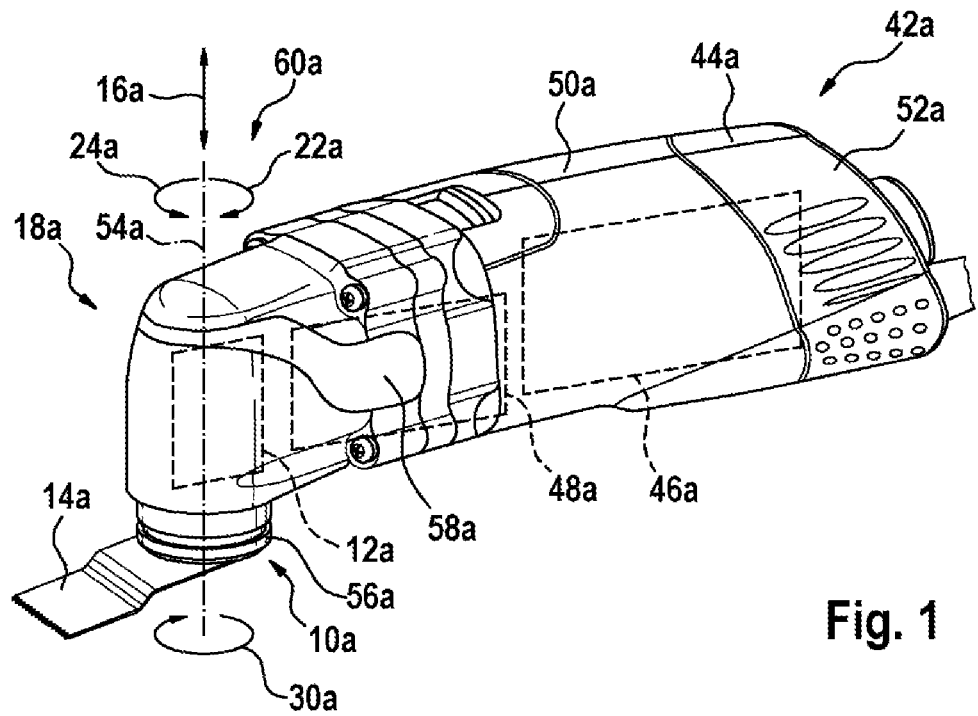
FIG. 1 shows a machine tool having a tool clamping fixture in a schematic representation.

FIG. 1 shows an electrically operated portable machine tool 42a having a tool clamping fixture 10a. The portable machine tool 42a comprises a machine tool housing 44a, which encloses an electric motor unit 46a and a gearbox unit 48a of the portable machine tool 42a. The machine tool housing 44a here comprises two housing half shells 50a, 52a, which are detachably connected to each other along a plane running through an axial direction 16a. It is also conceivable, however, for the machine tool housing 44a to have two or more cup-shaped housing parts, which can be detachably connected to each other. The axial direction 16a runs along and/or parallel to a rotation axis 54a of a hollow shaft (not represented in detail here) of the portable machine tool 42a, which hollow shaft is configured as a spindle. The hollow shaft is provided to oscillatingly drive, in a mounted state, a machining tool 14a. An oscillating drive of the machining tool 14a is here effected in a manner which is already known to a person skilled in the art, such as, for example, by means of a journal (not represented in detail here) of the gearbox unit 48a, which journal is disposed eccentrically on a drive shaft of the electric motor unit 46a and, by means of a link and a vibrating sleeve (not represented in detail here) of the gearbox unit 48a, drives the hollow shaft during operation of the portable machine tool 42a. The hollow shaft configured as a spindle can thus be driven oscillatingly. For the metal cutting of workpieces, the machining tool 14a can be fastened to a tool holder 56a of the portable machine tool 42a. The tool holder 56a is connected in a rotationally fixed manner to the hollow shaft by means of a positive and/or non-positive connection. It is also conceivable, however, for the tool holder 56a to be configured in one piece with the hollow shaft. A pivot motion of the hollow shaft can thus be transmitted to the tool holder 56a.

Figure 2:
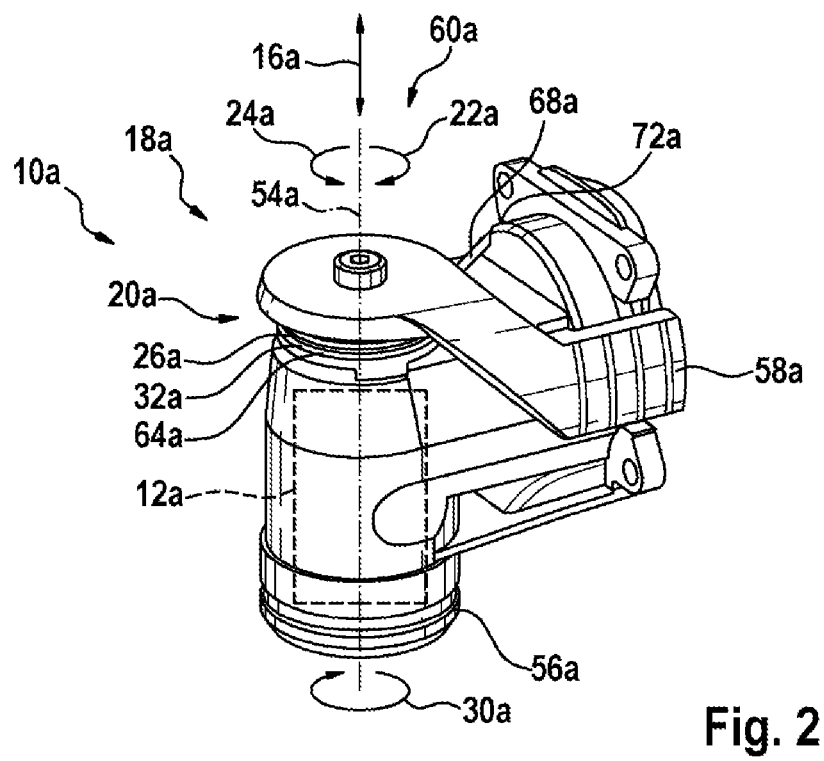
FIG. 2 shows a detailed view of the tool clamping fixture in a schematic representation.

FIG. 2 shows a detailed view of the tool clamping fixture 10a. The tool clamping fixture 10a comprises a clamping unit 12a for clamping the machining tool 14a in the axial direction 16a and a control unit 18a for actuating the clamping unit 12a. The control unit 18a has a control lever 58a. The control lever 58a is disposed on a side 60a of the machine tool housing 44a facing away from the tool holder 56a. In addition, the control lever 58a is mounted rotatably about the rotation axis 54a in the machine tool housing 44a. For actuation of the clamping unit 12a in order to generate and/or release a clamping force generated by means of the clamping unit 12a, the control lever 58a can be actuated by an operator.

Figure 3:
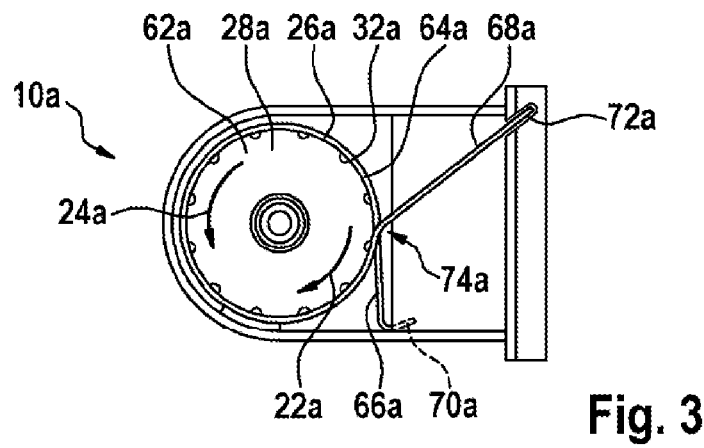
FIG. 3 shows a further detailed view of the tool clamping fixture in a schematic representation.

The tool clamping fixture 10a further comprises a return damping unit 20a, which is provided to damp a return motion of the control unit 18a. The return damping unit 20a is here provided to generate friction torques of different magnitude in oppositely directed motional directions 22a, 24a of the control unit 18a. Viewed along the axial direction 16a, the return damping unit 20a is arranged between the control lever 58a of the control unit 18a and the tool holder 56a. In addition, the return damping unit 20a has a return damping element 26a, which is disposed on a transmission unit 28a of the control unit 18a (FIG. 3). Viewed in a plane running perpendicular to the axial direction 16a, the transmission element 28a is of circular configuration. In addition, the transmission element 28a is configured as a cover cap 62a. The cover cap 62a is of cup-shaped configuration. It is also conceivable, however, for the transmission element 28a to have a different configuration which appears sensible to a person skilled in the art. The cover cap 62a is here configured rotationally fixed to the control lever 58a by means of a screw connection. It is also conceivable, however, for the cover cap 62a to be configured rotationally fixed to the control lever 58a by means of a different type of connection which appears sensible to a person skilled in the art, such as, for example, by means of an integral and/or positive connection.

The return damping element 26a is disposed along a peripheral direction 30a on the transmission element 28a, configured as a cover cap 62a, of the control unit 18a. The peripheral direction 30a runs in a plane extending perpendicular to the axial direction 16a. The return damping element 26a surrounds the transmission element 28a along the peripheral direction 30a along an angular range of 360°. The return damping element 26a is here configured as a leg spring 32a. The leg spring 32a has a plurality of coils 64a, which entwine the transmission element 28a, configured as a cover cap 62a, in an operating state along the peripheral direction 30a. The individual coils 64a of the leg spring 32a entwine the transmission element 28a respectively through an angle greater than 300°. The leg spring 32a further has a first leg 66a and a second leg 68a. The first leg 66a and the second leg 68a are respectively disposed with one end in receiving elements 70a, 72a of the machine tool housing 44a. The first leg 66a and the second leg 68a are thus connected to the machine tool housing 44a (FIG. 3). The first leg 66a extends tangentially away from the coils 64a. One end of the first leg 66a is bent over and ends in one of the receiving elements 70a, 72a. The first leg 66a is provided to transmit forces and/or torques to the machine tool housing 44a. The second leg 68a is bent in a tangential region 74a and runs, starting from the bend, rectilinearly in the direction of one of the receiving elements 70a, 72a. The second leg 68a is provided to pretension the leg spring 32a.

When the control lever 58a of the control unit 18a is actuated by an operator in the motional direction 22a corresponding to a release direction, the control lever 58a is rotated about the rotation axis 54a. The transmission element 28a configured as a cover cap 62a, as a consequence of the rotationally fixed connection to the control lever 58a, is jointly rotated. As a consequence of the connection of the first leg 66a and second leg 68a to the machine tool housing 44a, the leg spring 32a disposed along the peripheral direction 30a on the cover cap 62a is secured against twisting about the rotation axis 54a. Upon a motion of the control lever 58a along the motional direction 22a corresponding to the release direction, as a consequence of a friction between a side of the leg spring 32a which is facing toward the transmission element 28a configured as a cover cap 62a and a side of the transmission element 28a which is facing toward the leg spring 32a, a force acts along a course of the coils 64a of the leg spring 32a or a torque acts about the rotation axis 54a. By means of the force resulting from the friction or by means of the torque acting about the rotation axis 54a, the leg spring 32a is hereupon expanded, as a consequence of the twistproof connection of the leg spring 32a to the machine tool housing 44a, along a direction running perpendicular to the axial direction 16a. Between the leg spring 32a and the transmission element 28a configured as a cover cap 62a, a small friction torque thus acts in that motional direction 22a of the control lever 58a which corresponds to the release direction.

The control lever 58a is acted on by means of a spring force of a spring element (not represented in detail here) of the clamping unit 12a, which spring force, after a force effect of the operator has been neutralized following a movement of the control lever 58a in the motional direction 22a corresponding to the release direction, moves the control lever 58a via a mechanism (not represented in detail here) of the control unit 18a in a motional direction 24a corresponding to a clamping direction. The mechanism of the control unit 18a is provided to convert a rotary motion of the control lever 58a into a pivot motion and/or a translatory motion of a clamping element (not represented in detail here) of the clamping unit 12a for clamping the machining tool 14a. The clamping element is here captively disposed in the hollow shaft of the portable machine tool 42a. As a consequence of the spring force, the control lever 58a is rotated about the rotation axis 54a. By virtue of the rotationally fixed connection to the control lever 58a, the transmission element 28a, configured as a cover cap 62a, is jointly rotated about the rotation axis 54a. Upon a motion of the control lever 58a along the motional direction 24a corresponding to the clamping direction, as a consequence of a friction between that side of the leg spring 32a which is facing toward the transmission element 28a configured as a cover cap 62a and that side of the transmission element 28a which is facing toward the leg spring 32a, a force acts along a course of the coils 64a of the leg spring 32a or a torque acts about the rotation axis 54a. By means of the force resulting from the friction or by means of the torque acting about the rotation axis 54a, the leg spring 32a is hereupon contracted, as a consequence of the twist-proof connection of the leg spring 32a to the machine tool housing 44a, along a direction running perpendicular to the axial direction 16a. Between the leg spring 32a and the transmission element 28a configured as a cover cap 62a, in that motional direction 24a of the control lever 58a which corresponds to the clamping direction, is generated a friction torque which is many times greater than a friction torque which is generated upon a motion of the control lever 58a along the motional direction 22a corresponding to the release direction. The return motion of the control lever 58a of the control unit 18a along the motional direction 24a corresponding to the clamping direction is hereby damped. The acting friction torque between the leg spring 32a and the transmission element 28a is dependent on a wrap angle of the leg spring 32a and/or on a number of coils of the leg spring 32a and/or a friction coefficient between the leg spring 32a and the transmission element 28a.

In FIGS. 4 to 7, two alternative illustrative embodiments are represented. Substantially constant components, features and functions are basically denoted by the same reference symbols. In order to differentiate between the illustrative embodiments, the letters a to c are added to the reference symbols of the illustrative embodiments. The following description is substantially confined to the differences from the first illustrative embodiment in FIGS. 1 to 3, while, with respect to constant components, features and functions, reference can be made to the description of the first illustrative embodiment in FIGS. 1 to 3.

Figure 4:
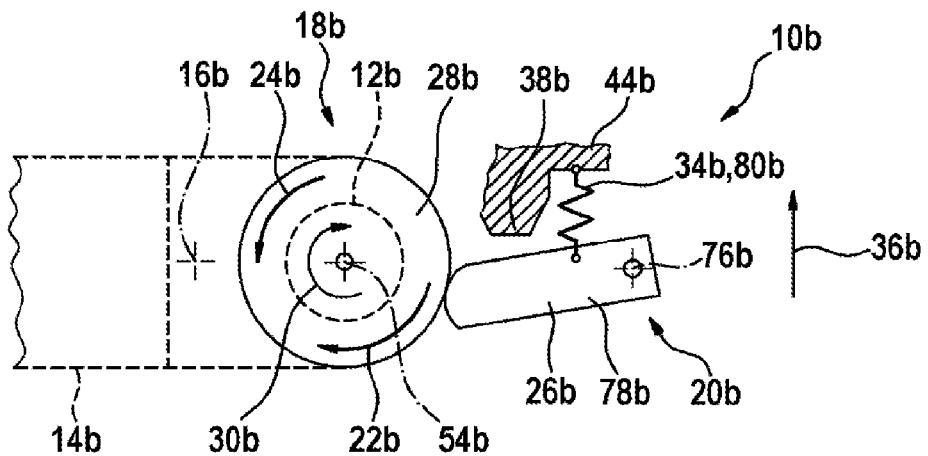
FIG. 4 shows a detailed view of an alternative tool clamping fixture in a schematic representation.

FIG. 4 shows a detailed view of an alternative tool clamping fixture 10b. The tool clamping fixture 10b is disposed in a portable machine tool (not represented in detail here), which has a structure analogous to the portable machine tool 42a from FIG. 1. In addition, the tool clamping fixture 10b comprises a clamping unit 12b for clamping a machining tool 14b in an axial direction 16b and a control unit 18b for actuating the clamping unit 12b. Furthermore, the tool clamping fixture 10b has a return damping unit 20b, which is provided to damp a return motion of the control unit 18b. The return damping unit 20b is further provided to generate friction torques of different magnitude in oppositely directed motional directions 22b, 24b of the control unit 18b. The return damping unit 20b here comprises a return damping element 26b, which is disposed on a transmission element 28b of the control unit 18b. The return damping element 26b is pivotably mounted. A pivot axis 76b of the return damping element 26b runs at least substantially parallel to the axial direction 16b. The return damping element 26b is configured as a wedge element 78b. The wedge element 78b extends along a direction running at least substantially perpendicular to the axial direction 16b.

Furthermore, the return damping element 20b has a spring element 34b, which is provided to subject the return damping element 26b to a spring force in a direction 36b. The spring element 34b is configured as a tension spring 80b. One end of the tension spring 80b is connected to the return damping element 26b. A further end of the tension spring 80b is connected to a machine tool housing 44b of the portable machine tool. The return damping element 20b further comprises a stop element 38b, which is provided to limit a motion of the return damping element 26b in the direction 36b. The stop element 38b is configured in one piece with the machine tool housing 44b. It is also conceivable, however, for the stop element 38b to be configured separate from the machine tool housing 44b.

When a control lever (not represented in detail here) of the control unit 18a, which control lever is connected in a rotationally fixed manner to the transmission element 28b, is actuated by an operator in a motional direction 22b corresponding to a release direction, the transmission element 28b is rotated about a rotation axis 54b. The return damping element 26b configured as a wedge element 78b is hereupon moved away from the stop element 38b, as a consequence of a friction between the transmission element 28b and the wedge element 78b, counter to the spring force of the tension spring 80b of the return damping unit 20b. A small friction torque thus acts between the wedge element 78b and the transmission element 28b in that motional direction 22b of the control lever of the control unit 18b which corresponds to the release direction. The tension spring 80b is provided to prevent a loss of contact between the transmission element 28b and the wedge element 78b.

Figure 5:
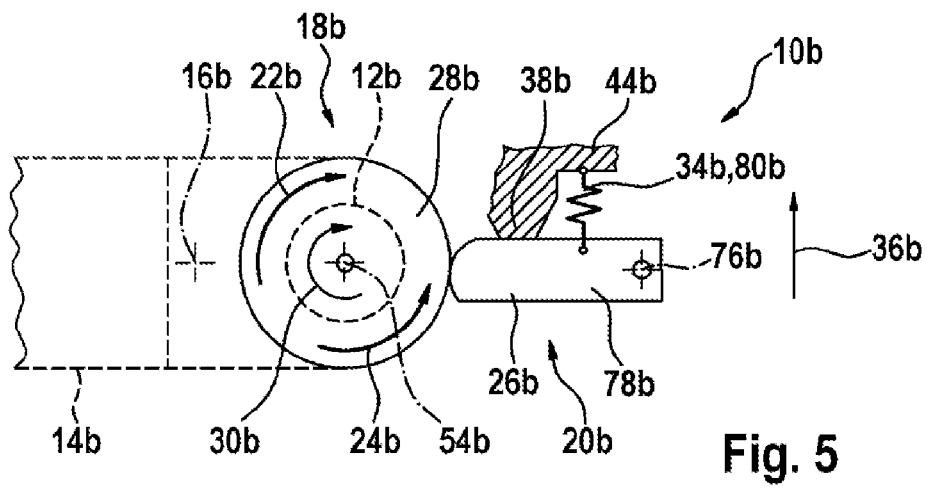
FIG. 5 shows a further detailed view of the alternative tool clamping fixture from FIG. 4 in a damping mode of a return damping unit of the alternative tool clamping fixture in a schematic representation.

The control lever is acted on by means of a spring force of a spring element (not represented in detail here) of the clamping unit 12b, which spring force, after a force effect of the operator has been neutralized following a movement of the control lever in the motional direction 22b corresponding to the release direction, moves the control lever via a mechanism (not represented in detail here) of the control unit 18b in a motional direction 24a corresponding to a clamping direction. The mechanism of the control unit 18b is provided to convert a rotary motion of the control lever into a pivot motion and/or a translatory motion of a clamping element (not represented in detail here) of the clamping unit 12b for clamping the machining tool 14b. As a consequence of the spring force of the spring element of the clamping unit 12b, the control lever is rotated about the rotation axis 54b. By virtue of the rotationally fixed connection to the control lever, the transmission element 28b is jointly rotated about the rotation axis 54b (FIG. 5). Upon a motion of the transmission element 28b along the motional direction 24b corresponding to the clamping direction, the wedge element 78b, as a consequence of a friction between the transmission element 28b and the wedge element 78b, is pivoted about the pivot axis 76b in the direction of the stop element 38b until the wedge element 78b bears against the stop element 38b. The pivot motion of the wedge element 78b in the direction of the stop element 38b is supported by means of the spring force of the tension spring 80b. Upon a bearing contact of the wedge element 78b against the stop element 38b and a further motion of the transmission element 28b in the motional direction 24b corresponding to the clamping direction, a wedge effect between the wedge element 78b and the transmission element 28b is produced. Starting from the wedge element 78b, a large normal force here acts on the transmission element 28b. As a consequence of the motion of the transmission element 28b in the motional direction 24b corresponding to the clamping direction, the large normal force generates a friction torque which is many times greater than a friction torque which is generated upon a motion of the control lever along the motional direction 22b corresponding to the release direction. As a result, the return motion of the control lever of the control unit 18b along the motional direction 24b corresponding to the clamping direction is damped. The acting friction torque between the wedge element 78b and the transmission element 28b is dependent on a friction coefficient between the wedge element 78b and the transmission element 28b.

Figure 6:
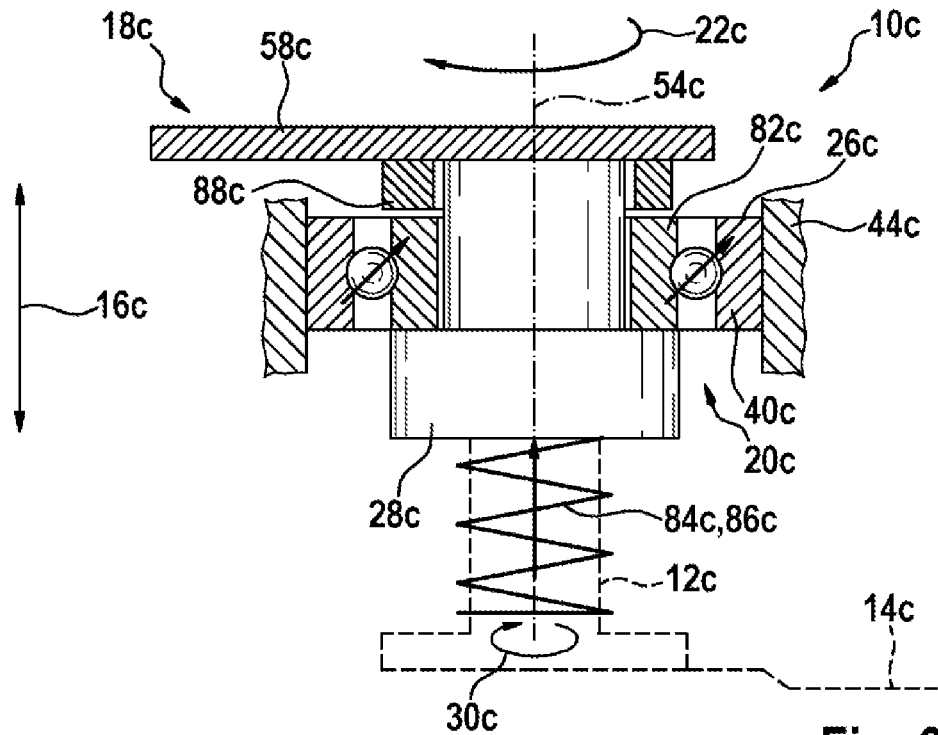
FIG. 6 shows a detailed view of a further alternative tool clamping fixture in a schematic representation.

FIG. 6 shows a detailed view of a further alternative tool clamping fixture 10c. The tool clamping fixture 10c is disposed in a portable machine tool (not represented in detail here), which has a structure analogous to the portable machine tool 42a from FIG. 1. In addition, the tool clamping fixture 10c comprises a clamping unit 12c for clamping a machining tool 14c in an axial direction 16c and a control unit 18c for actuating the clamping unit 12c. Furthermore, the tool clamping fixture 10c has a return damping unit 20c, which is provided to damp a return motion of the control unit 18c. The return damping unit 20c is further provided to generate friction torques of different magnitude in oppositely directed motional directions 22c, 24c of the control unit 18c. The return damping unit 20c here comprises a return damping element 26c, which is disposed on a transmission element 28c of the control unit 18c. The return damping element 26c is configured as a freewheeling roller bearing 40c, which is provided to prevent a rotary motion at least in one rotational direction 22c, 24c. The transmission element 28c is here arranged at a distance from the roller bearing 40c along a direction running substantially perpendicular to the axial direction 16c. In a mounted state, the transmission element 28c bears along the axial direction 16c against an inner race 82c of the roller bearing 40c. The roller bearing 40c has a blocking unit (not represented in detail here) already known to a person skilled in the art, which is provided to block a rotary motion of the roller bearing 40c and/or of the inner race 82c in the motional direction 24c. A rotary motion of the roller bearing 40c and/or of the inner race 82c about the rotation axis 54c is prevented by means of the blocking unit.

When a control lever 58c of the control unit 18c, which control lever is connected to the transmission element 28c, is actuated by an operator in a motional direction 22c corresponding to the release direction, the transmission element 28c is rotated about a rotation axis 54c. Between the control lever 58c and the roller bearing 40c, viewed along the axial direction 16c, is arranged a spacer sleeve 88c. As a result of the bearing of the transmission element 28c along the axial direction 16c against the inner race 82c of the roller bearing 40c, the inner race 82c is rotated jointly with the transmission element 28c about the rotation axis 54c. A small friction torque thus acts between the inner race 82c of the roller bearing 40c and the transmission element 28c in that motional direction 22c of the control lever 58c of the control unit 18c which corresponds to the release direction.

Figure 7:
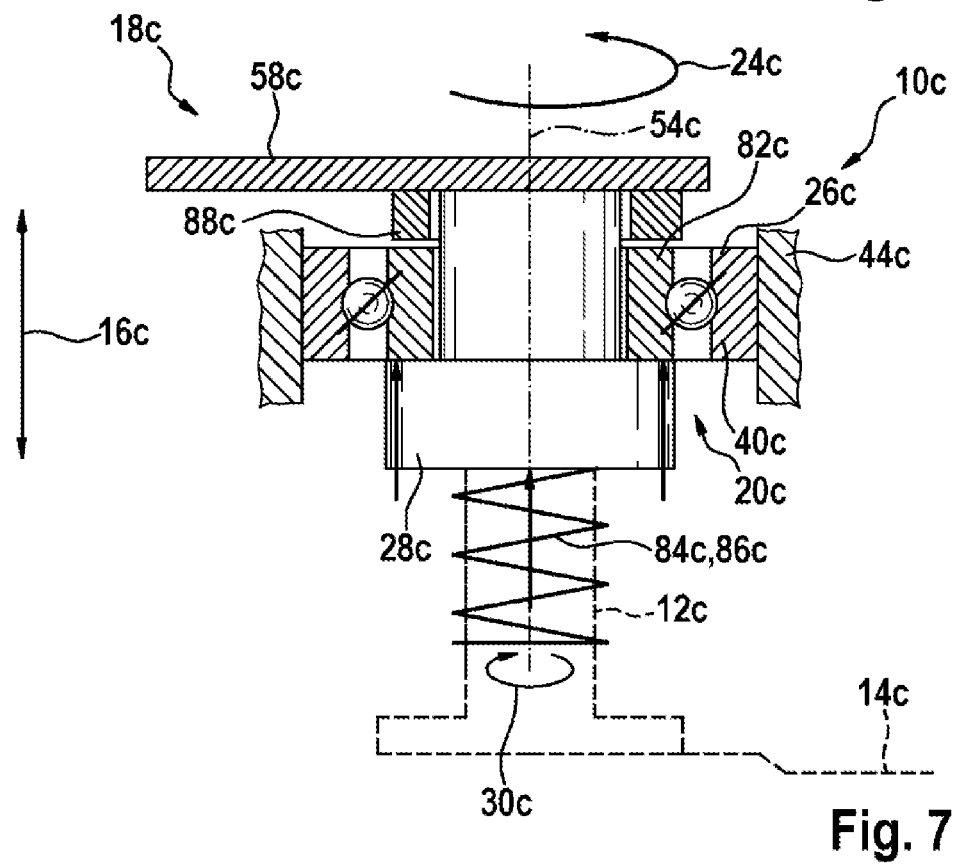
FIG. 7 shows a further detailed view of the further alternative tool clamping fixture from FIG. 6 in a damping mode of a return damping unit of the further alternative tool clamping fixture in a schematic representation.

The control lever 58c is acted on by means of a spring force of a spring element 84c, configured as a compression spring 86c, of the clamping unit 12c, which spring force, after a force effect of the operator has been neutralized following a movement of the control lever 58c in the motional direction 22c corresponding to the release direction, moves the control lever 58c via a mechanism (not represented in detail here) of the control unit 18c in a motional direction 24c corresponding to a clamping direction. The mechanism of the control unit 18c is provided to convert a rotary motion of the control lever 58c into a pivot motion and/or a translatory motion of a clamping element (not represented in detail here) of the clamping unit 12c for clamping the machining tool 14c. As a consequence of the spring force of the spring element 84c of the clamping unit 12c, the control lever 58c is rotated about the rotation axis 54c. By virtue of the rotationally fixed connection to the control lever 58c, the transmission element 28c is jointly rotated about the rotation axis 54c (FIG. 7). The roller bearing 40c and/or the inner race 82c is barred by means of the blocking unit of the roller bearing 40c from jointly rotating along the motional direction 24c about the rotation axis 54c. The transmission element 28c is subjected by the spring element 84c to a spring force in the direction of the roller bearing 40c. The transmission element 28c is hereby pressed against the inner race 82c. As a consequence of the pressing of the transmission element 28c against the inner race 82c and a rotary motion, prevented by means of the blocking unit, of the inner race 82c along the motional direction 24c, upon a rotary motion of the transmission element 28c about the rotation axis 54c a friction torque is generated between the transmission element 28c and the inner race 82c, which friction torque is many times greater than a friction torque which is generated upon a motion of the control lever 58c along the motional direction 22c corresponding to the release direction. The return motion of the control lever 58c of the control unit 18c along the motional direction 24c corresponding to the clamping direction is hereby damped. The acting friction torque between the inner race 82c and the transmission element 28c is dependent on a friction coefficient between the inner race 82c and the transmission element 28c. The acting friction torque can additionally be increased by means of a pretensioned cup spring arranged, as an alternative to the spacer sleeve 88c, between the control lever 58c and the roller bearing 40c.

The invention claimed is:

1. A tool clamping fixture, comprising:
    at least one clamping unit configured to clamp a machining tool in an axial direction;
    at least one control unit configured to actuate the at least one clamping unit; and
    at least one return damping unit configured at least to damp a return motion of the at least one control unit,
    wherein the at least one return damping unit is configured to generate friction torques of different magnitude in oppositely directed motional directions of the at least one control unit.

2. The tool clamping fixture as claimed in claim 1, wherein the at least one return damping unit has at least one return damping element disposed on a transmission element of the at least one control unit.

3. The tool clamping fixture as claimed in claim 2, wherein the at least one return damping element is disposed along a peripheral direction on the transmission element of the at least one control unit.

4. The tool clamping fixture as claimed in claim 2, wherein the at least one return damping element is configured as a leg spring.

5. The tool clamping fixture as claimed in claim 2, wherein the at least one return damping element is pivotably mounted.

6. The tool clamping fixture as claimed in claim 5, wherein the at least one return damping unit has at least one spring element configured to subject the at least one return damping element to a spring force in at least one direction.

7. The tool clamping fixture as claimed in claim 5, wherein the at least one return damping unit has at least one stop element configured to limit a motion of the at least one return damping element in at least one direction.

8. The tool clamping fixture as claimed in claim 2, wherein the at least one return damping element is configured as a freewheeling roller bearing configured to prevent a rotary motion at least in one motional direction.

9. A portable machine tool, comprising:
at least one tool clamping fixture, including:
- at least one clamping unit configured to clamp a machining tool in an axial direction;
- at least one control unit configured to actuate the at least one clamping unit; and
- at least one return damping unit configured at least to damp a return motion of the at least one control unit,
- wherein the at least one return damping unit is configured to generate friction torques of different magnitude in oppositely directed motional directions of the at least one control unit.

* * * * *